(No Model.) 2 Sheets—Sheet 1.

J. COFFIN.
MANUFACTURE OF FORGED CAR WHEELS.

No. 357,980. Patented Feb. 15, 1887.

Witnesses
Sidney Postlethwaite,
M. G. Moore

John Coffin Inventor
by Cyrus Elder
Attorney (No Model.) 2 Sheets—Sheet 2.

J. COFFIN.
MANUFACTURE OF FORGED CAR WHEELS.

No. 357,980. Patented Feb. 15, 1887.

Witnesses

John Coffin Inventor
by Cyrus Elder
Attorney

UNITED STATES PATENT OFFICE.

JOHN COFFIN, OF JOHNSTOWN, PENNSYLVANIA, ASSIGNOR TO THE CAMBRIA IRON COMPANY, OF PENNSYLVANIA.

MANUFACTURE OF FORGED CAR-WHEELS.

SPECIFICATION forming part of Letters Patent No. 357,980, dated February 15, 1887.

Application filed November 1, 1886. Serial No. 217,669. (No model.)

*To all whom it may concern:*

Be it known that I, JOHN COFFIN, a citizen of the United States, residing in Johnstown, Pennsylvania, have invented certain new and useful Improvements in the Manufacture of Forged Car-Wheels; and I do hereby declare that the following is a full, clear, and exact description of the invention, which will enable others skilled in the art to which it appertains to make and use the same.

My invention relates to that class of wheels which have a separate tire attached to the wheel-body; and it consists in the method of forging such wheel-body, and relates, more particularly, to the forming of a suitable and secure pile for welding the central portion to the rim portion of such body.

In describing my invention reference will be made to the accompanying drawings, forming part of this specification, and in which—

Figure 1:
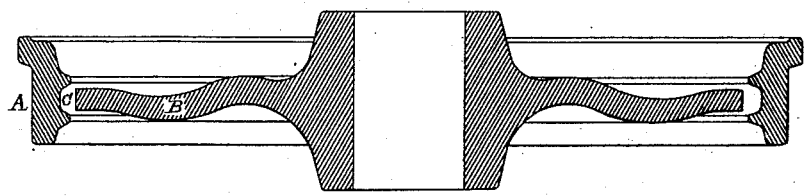
Figure 4:
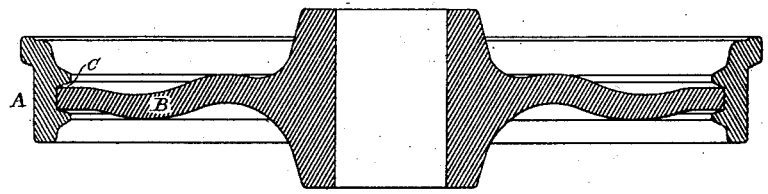
Figure 5:
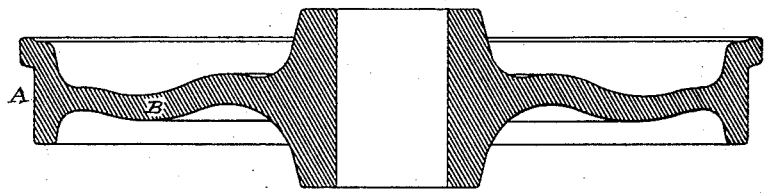
Figure 8:
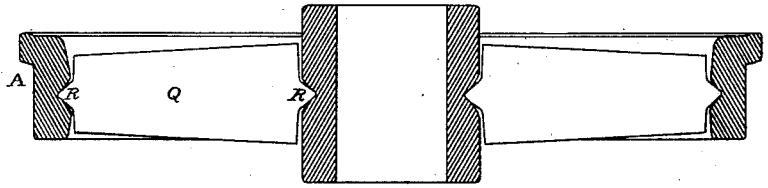
Figure 6:
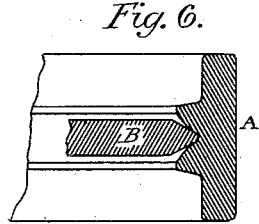
Figure 7:
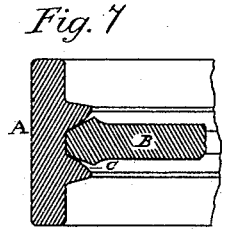
Figure 9:
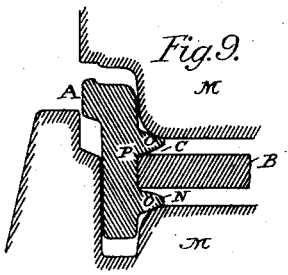
Figure 2:
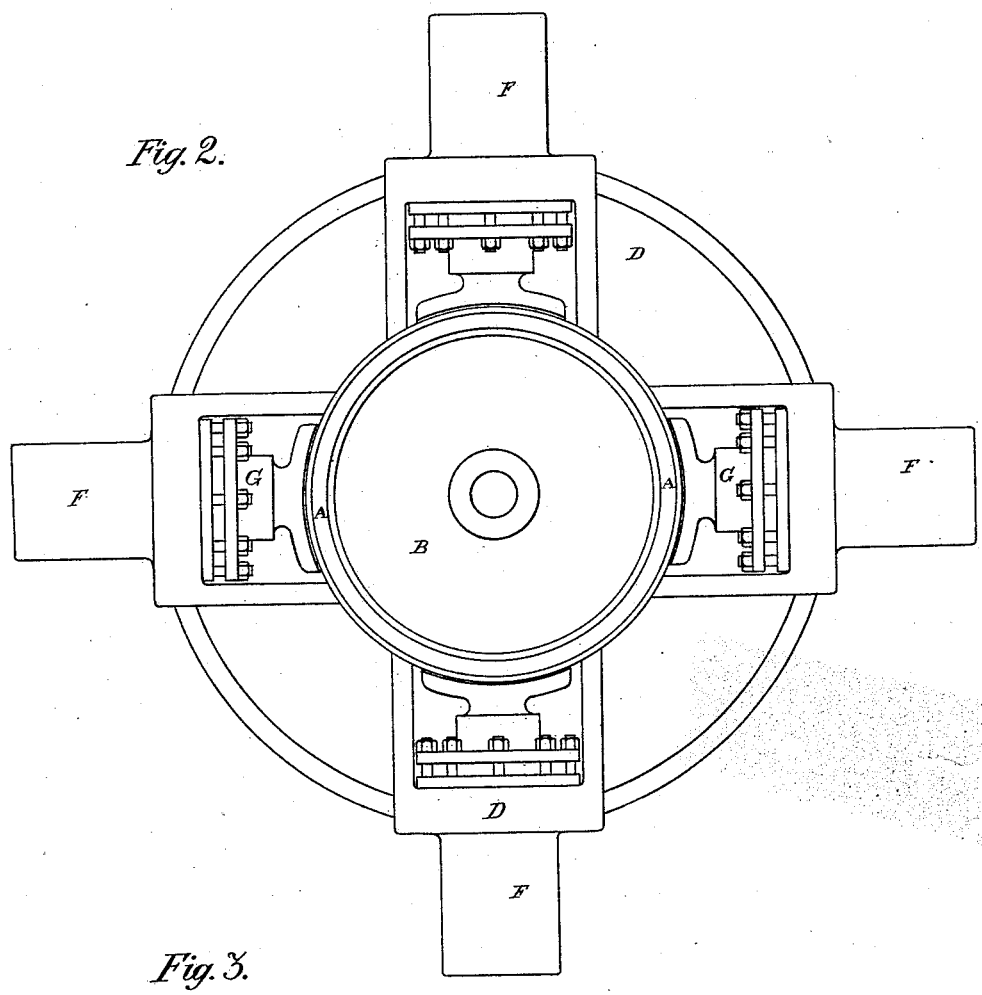
Figure 3:
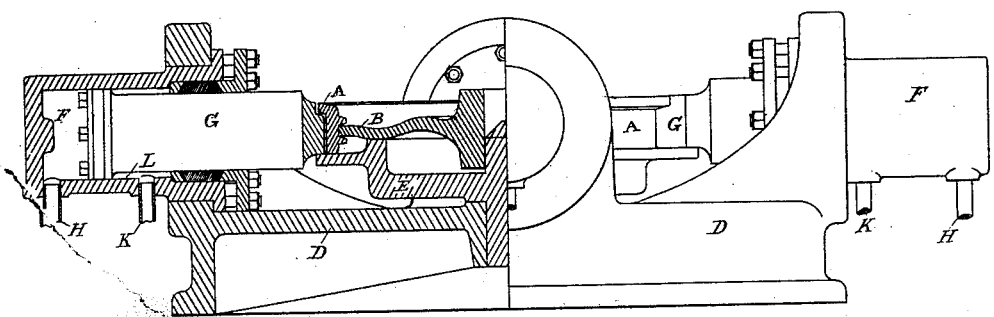

Figure 1 is a sectional view of the web portion and the rim portion of a web-wheel before assembling into a welding-pile. Figs. 2 and 3 are respectively a plan and elevation in half-section of the press I use in forming the pile. Fig. 4 is a sectional view of the pile ready for welding. Fig. 5 is a sectional view of the complete forging. Figs. 6, 7, and 9 show various other forms of interlock which may be used. Fig. 8 is a sectional view of a pile for a spoked wheel.

To carry my invention into effect, I first forge the central portion, B, Fig. 1, the web and hub being integral for a web-wheel, and for a spoked wheel the hub and spokes may be integral or separate. Then I forge the rim portion A, Fig. 1, with an inner recess, C, of suitable shape to interlock with the spokes or web of the central portion, and with its least inner diameter greater than the diameter of the central portion, B, Fig. 1. I then place the central portion and rim together in a suitable hydraulic press, (shown in Figs. 2 and 3,) the rim being hot, and compress the rim until it firmly interlocks (see Fig. 4) with the central portion. This completes the pile for welding. The next step in the process is to charge this pile in a furnace and bring it to a welding-heat, when it is put in suitable hammer or press dies, and the operation of welding and forming the wheel is completed, Fig. 5 showing the complete forging in section. Figs. 4, 6, and 9 show various forms of interlock which may be used, the shape being such that the cinder will squeeze out during the act of welding. Fig. 8 shows how a pile may be formed for a spoked wheel. The spokes Q Q are forged with tenons R R R R on their ends. The wheel is then assembled in the press, the spokes being cold, the rim and hub being hot. The rim being compressed by pressure applied to its periphery, the tenons on the spokes embody themselves into the metal of the hub and rim, respectively, thus making a secure pile.

I will now describe more fully the machine used to carry my invention into effect, referring to Figs. 2 and 3.

D is the frame of the machine, on which are mounted four hydraulic cylinders, F F F F, arranged equidistant from each other, with their rams G G G G facing toward a common center, all as shown in Fig. 2.

E, Fig. 3, shows a revoluble table with a vertical axis, on which the wheel-pile rests while being operated on by the rams G G G G. The four cylinders F F F F, with their rams G G G G, being exactly alike, a description of the working of one of them is sufficient.

Referring to the one shown in section in Fig. 3, H is the pipe through which pressure is applied to the ram G. It is also relieved through the same pipe. The annulus L is subjected to constant pressure through the pipe K, and acts as a pull-back to the ram when the pressure is removed from its back end through the opening H. Suitable means are provided to revolve the table E through one-eighth of a revolution, so that after the rams G G G G have acted on the rim A in the four places opposite the rams G G G G, the table E, bearing the assembled rim A and web B, may be revolved, so as to bring the intermediate parts of the rim opposite the rams, when they are in turn operated upon.

I am aware that car-wheel-forging piles have been made in which the rim and central portion interlock; but such interlock is attained by spreading the hot metal of the central portion while the rim portion remains cold. Such method is open to the objection that when the central portion cools it shrinks away from the rim portion, or, if charged immediately into the furnace, the rim portion expands away from the central portion, leaving an open space, which is liable to oxidize heavily in the furnace, thus preventing a perfect weld, whereas, by my method of compressing the hot outer or rim portion to make it embrace and interlock with the cold central portion, the pile is left in such condition as regards the heat of its parts that when brought to a uniform temperature in the furnace the rim portion hugs the central portion even more firmly than before, thus preventing oxidation at the bottom of the recess C, and thereby making a more perfect weld. Furthermore, referring to Fig. 9, M M show the dies about to strike the welding blow on the rim A, a small section at the circumference being shown. The form of the recess C is such that it closes first at the bottom of the recess, as at P, and last at the mouth of the recess, as at N, so as to knead or roll the scale out; but if the web B does not fit closely into the rim A, as is the case in the other above-described process, the ribs O O, forming the recess C between them, being the first part acted upon by the dies, as shown, will be closed upon the web B before the scale has been squeezed out from the bottom of the recess C, thus imprisoning scale and making an imperfect weld—an evil which my method avoids.

Having fully described my invention, what I desire to claim and secure by Letters Patent is—

1. The method herein specified of manufacturing forged car-wheel bodies, consisting in forging the central portion separate and forging the rim with a recessed or interlocking inner surface and then placing them in a suitable press and compressing the rim until it firmly interlocks with the central portion, thus forming a pile which may be brought to a welding-heat and welded and formed in suitable dies by blows or pressure.

2. In forging a spoked-wheel body, the method herein specified of forging the spokes with tenons on the ends and then placing the hub, spokes, and rim in a suitable press, the rim and hub being hot and the spokes cold, and compressing the rim until the tenons on the spokes are forced into the metal of the rim and hub, thus forming a pile which may be brought to a welding-heat and welded and formed in suitable dies by blows or pressure.

3. A pile for a car-wheel body of any kind or description, formed by compressing the rim or outer portion to cause it to embrace, interlock, or unite with any arrangement of center.

JOHN COFFIN.

Witnesses:
SIDNEY POSTLETHWAITE,
M. G. MOORE.